Aug. 26, 1969     G. G. HATCH     3,463,629

MANUFACTURING STEEL AND ALLOYS OF IRON

Filed Aug. 15, 1966     4 Sheets-Sheet 1

INVENTOR.
GERALD GORDON HATCH

BY *Maybee & Legris*

ATTORNEYS

Aug. 26, 1969     G. G. HATCH     3,463,629
MANUFACTURING STEEL AND ALLOYS OF IRON
Filed Aug. 15, 1966     4 Sheets-Sheet 2

Aug. 26, 1969 G. G. HATCH 3,463,629
MANUFACTURING STEEL AND ALLOYS OF IRON
Filed Aug. 15, 1966 4 Sheets-Sheet 3

INVENTOR.
GERALD GORDON HATCH
BY Maybee & Legris
ATTORNEYS

INVENTOR.
GERALD GORDON HATCH
BY Maybee & Legris
ATTORNEYS

United States Patent Office 3,463,629
Patented Aug. 26, 1969

3,463,629
MANUFACTURING STEEL AND ALLOYS OF IRON
Gerald Gordon Hatch, 37 Bloor St. W.,
Toronto, Ontario, Canada
Filed Aug. 15, 1966, Ser. No. 572,468
Claims priority, application Great Britain, Sept. 3, 1965, 37,705/65
Int. Cl. C21c 5/52; C22b 9/02
U.S. Cl. 75—11     17 Claims

ABSTRACT OF THE DISCLOSURE

A process for the manufacture of steel and other alloys of iron from sponge iron in an electric arc furnace in which a layer of molten metal is formed in the furnace, the furnace sidewalls are charged with sponge iron to above the slag line and sponge iron is continuously charged in and around the electrodes to maintain excess solid charge in the furnace around the electrodes while continuously melting the sponge iron charged. Sponge iron is fed to and maintained banked against the sidewalls of the furnace during melting, gangue slag is removed from the furnace during melting and molten iron is formed in and tapped from the furnace.

---

This invention relates to the manufacture of steel and alloys of iron in electric arc furnaces by the melting of iron sponge together with scrap steel, with the addition of metal oxides if desired, and more particularly to a method of charging an electric arc furnace with sponge iron, together with any desired alloying elements, and smelting the same to produce steel or iron alloys therefrom.

In the production of steel in an electric arc furnace, the normal practice is to fill the furnace with steel scrap, melt the scrap, shut off the power, re-charge and melt until sufficient metal has been liquified. The metal is then refined and converted into a heat of steel. Because of the need to shut down the furnace while it is being charged, this method is quite inefficient. Where sponge iron is employed as a major replacement for scrap in electric steelmaking and where conventional bucket charging methods are employed, difficulties are experienced in making steel. In melting a furnace filled with sponge iron, the latter tends to sinter, and the bath undercuts the sponge with consequent danger of sudden collapse of sintered sponge into the steelmaking bath. Where low grade sponge iron is used, particularly sponge with a high titania content, a large volume of slag results. With normal techniques this high volume of corrosive slag results in a long, inefficient melting period and a high incidence of refractory attack on the furnace walls.

It has now been discovered that finished steel can be manufactured from sponge iron in an electric arc furnace by melting sponge and/or scrap steel at the bottom of the furnace to form a liquid heel of iron or steel therein with the furnace being then continuously charged through charging holes in the roof with sponge iron, and, if desired, fluxes, carbon and metal oxides, into the areas of most intense heat adjacent the electrodes of the furnace, while retaining a protective wall of unmelted charge along the side walls of the furnace and keeping the slag fluid, to form a charge of molten steel therefrom. Other alloys of iron can also be made by the process of the invention from a charge of sponge iron, carbon and metal oxides or alloying elements.

Furthermore, according to another embodiment of the invention the furnace is initially charged with sponge iron, and, if desired, scrap iron or steel, with the sponge iron being at least banked along the lower walls of the furnace but not extending much above the slag line near the slag spout. The initial charge is partially melted to give a liquid heel of iron or steel. While retaining a protective wall of unmelted charge adjacent the walls of the furnace, the furnace is then continuously charged through charging holes in the roof of the furnace with sponge iron and, if desired, fluxes, carbon and metal oxides, into the areas of most intense heat adjacent the electrodes of the furnace at a rate consistent with a fluid slag while continuously supplying power to the electrodes. Steel or iron alloy is then tapped from the furnace.

It is an object of the present invention to provide a novel method for charging sponge iron to an electric arc furnace and melting the same therein to obtain finished steel or iron alloys therefrom.

It is another object of the invention to provide a continuous process for manufacturing steel and iron alloys from sponge iron in an electric arc furnace.

Other objects and advantages of the invention will be apparent from the following description taken in conjunction with the accompanying drawing in which.

Generally speaking, the present invention relates to a process for the manufacture of steel and other alloys of iron from sponge iron in an electric arc furnace. The sidewalls of the furnace are charged with sponge iron pellets to above the slag line and power is supplied to the furnace electrodes to form a pool of molten metal at the bottom of the furnace. Sponge iron is then continually and substantially uniformly charged around the electrodes into the areas of most intense heat to provide excess solid charge in the furnace while maintaining substantially uniform power input to the electrodes to melt the sponge iron being charged. Fluxes and metal oxides necessary for the maintenance of a fluid slag are added. Sponge iron addition is maintained and is controlled, along with the power input to the electrodes, to maintain a fluid slag and to maintain a stable arc. During melting solid sponge iron is maintained in a banked condition around the furnace sidewalls to protect the sidewalls from slag attack and gangue slag is removed from the furnace at intervals to minimize the tendency for sidewall slag attack. Molten steel or iron alloy formed from the melted sponge iron is tapped from the furnace.

Referring to FIGS. 1 to 5 an electric arc furnace for manufacturing steel or alloys of iron according to the process of the invention has a furnace shell 11 which is equipped with a metal pouring spout 16, a slag pouring spout 17 and a roof 12 through which pass electrodes 13. Charging holes 14 are located in the roof 12 outboard of but adjacent to the electrodes 13, so that the charge is fed into the areas of most intense heat around the electrodes 13. A charging hole 14 may also be located, in a three electrode furnace (see FIG. 2), in the center of the roof 12. In any large furnace, such as the furnaces shown in FIGS. 2 to 5, auxiliary charge holes 15 may be located near the periphery of the roof 12. The most important of the auxiliary charge holes 15, if present on the furnace, are the groups of three which are nearest each electrode 13, the other auxiliary charge holes 15 being of less importance.

The normal methods of making steel and iron alloys employ a batch-type operation. In using the process of the present invention a liquid heel of metal is first made by melting scrap iron or steel, or sponge iron or scrap plus sponge in the bottom of the furnace. Alternatively, such a heel of metal may be retained from a previous heat. Although scrap is most advantageous for starting the furnace, because of its good arc striking characteristics, sponge iron can be used alone for making the liquid heel of metal.

Figure 1:
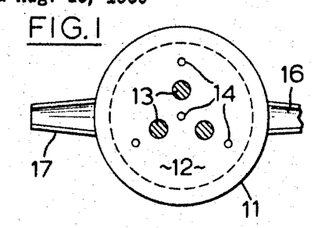
FIG. 1 is a diagrammatic plan view of the top of a small three electrode furnace adapted for use according to the invention.
Figure 2:
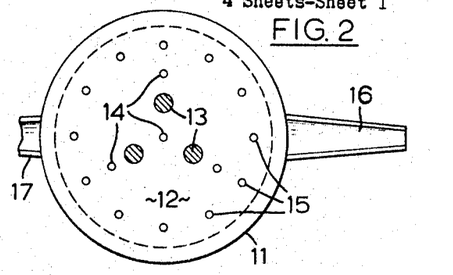
FIG. 2 is a diagrammatic plan view of the top of a large three electrode furnace used with the invention.
Figure 3:
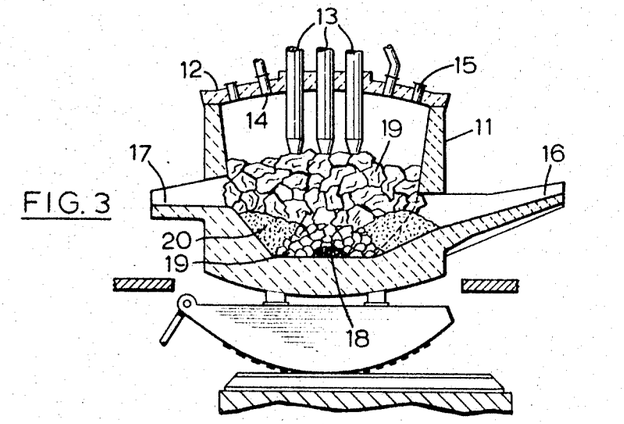
FIG. 3 is a sectional, elevational view of an embodiment of the furnace illustrated in FIG. 2 showing the conditions at the start of meltdown when small amounts of sponge iron are used initially in the process of the invention.
Figure 4:
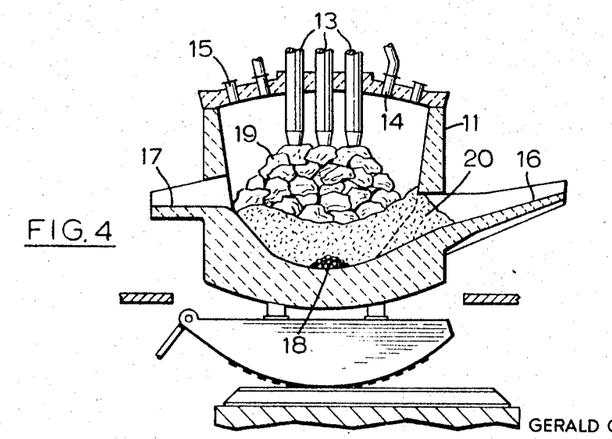
FIG. 4 is a sectional, elevational view of another embodiment of the furnace illustrated in FIG. 2 showing the conditions at the start of meltdown when large amounts of sponge iron are used initially in the process of the invention.

If both sponge and scrap are used initially, varying quantities of each can be used as illustrated in FIGS. 3 and 4 and described hereinafter, depending on the relative costs of scrap and sponge. However, as aforementioned, sponge iron may replace the scrap entirely on start up. Scrap 19 is charged nearest the electrodes 13, arcing being more readily obtained with scrap, and sponge iron 20 is banked up adjacent to the furnace shell 11 to protect the wall from refractory attack during meltdown. The height of the sponge 20 is not allowed to rise much above the slag line on the side of the furnace nearest the slag spout 17 because of the danger of the sponge 20 sintering in the slag spout 17. However, if a lot of sponge 20 is used, the sponge may be allowed to rise higher elsewhere in the furnace as shown in FIG. 4.

To facilitate the use of a large amount of sponge the furnace may be modified to give a greater volume in the furnace below the slag line as shown in FIG. 4. For maximum efficiency and to provide a large heat absorbing capacity in the furnace other than in the walls, as much charge as possible is added to the furnace before the melting commences. It is also desirable to line the lower walls of the furnace with lime prior to the initial charging to help protect the furnace walls from refractory attack. As shown in FIGS. 3 and 4 coke 18 may also be added initially if desired, particularly in making steel where carbon is to be controlled in the electric furnace.

The power is put on at or near the full rate and the furnace charge is partially melted so that the metal bath is fluid to the bottom of the furnace but a protective wall of unmelted sponge remains adjacent to the furnace wall to protect the furnace wall from refractory attack.

Roof charging is commenced at this point. Iron sponge 20, and, if desired, fluxes, carbon and any desired metal oxides are continuously fed through the charging holes 14 at controlled rates into the areas of most intense heat adjacent to the electrodes 13. The roof feeding system is operated such that the feed rate is accurately recorded and the charge constituents are so proportioned that slag 21 which is formed (see FIG. 5) is fluid. The charging rate and power input are positively controlled so that the bath temperature is not allowed to rise markedly above the melting point of iron during most of the melting period. This minimizes undercutting of the slag and refractory attack and prevents the occurrence of violent boiling due to the reaction of carbon with metals in the slag. The continuous charging procedure followed in the present process is one of the most important features of the invention and it permits instantaneous and continuous control of charging rate relative to the power input with very uniform charging and power input being possible throughout the melting process. Thus, with the constant exact control attainable, slag fluidity is always controlled and the furnace remains in substantially perfect thermal balance.

Figure 5:
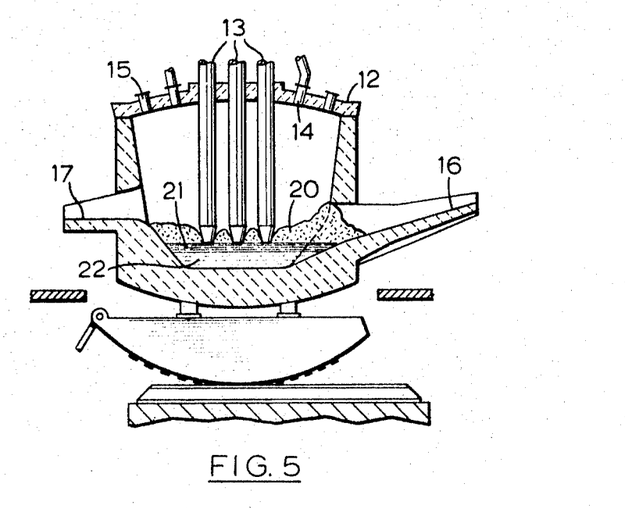
FIG. 5 is a further view of the furnace shown in FIG. 3 illustrating the conditions in the furnace during meltdown.

While retaining consistent slag fluidity, the top charge iron sponge material 20 (see FIG. 5) is allowed to build up around the electrodes 13, as shown in FIGURE 5, thereby not only protecting the side walls from arc flare but minimizing heat losses during melting and increasing the rate of melting. When the sponge iron 20 is in the form of a relatively low density agglomerate, the arc is still mainly between the tips of the electrodes 13 and bath 22 and it is possible to physically smother the arc with the sponge iron 20. This feature is particularly important at high power levels as it will allow the voltage to be raised while controlling the metal bath temperature. The latter is a function of power used per ton of charge, furnace operating power, voltage, slag resistivity and slag and metal bath depths. The ability to physically smother the arc with low bulk density sponge not only allows wider latitude in operating voltages but also minimizes heat loss to roof and walls, thereby minimizing refractory attack and increasing the efficiency of the melting.

Charge is added from time to time, advantageously through the auxiliary feed ports 15, to maintain a protective wall of unmelted sponge iron charge 20 adjacent to the walls of the furnace and thereby substantially reduce slag attack on the walls. Also, it is important to maintain excess solid sponge iron in the furnace to keep slag and metal as cool as possible while still fluid. Enough solid sponge iron is charged to and maintained in the furnace so that there is more charge than the power will consume but still consistent with the maintenance of a fluid slag.

Although charge is allowed to build up around the electrodes in the present process to reduce arc flare, minimize heat losses and increase the rate of melting, the process is quite different from and superior to those in which the furnace is choke-fed with solid charge being fed to near the top of a furnace. Thus, choke-fed furnaces have been greatly limited by arc instability due to the severe smothering of the arc by choke feeding. As a result the furnace must be run at low voltage and the power input is thereby restricted. In the present novel process choke feeding is avoided and the amount of excess solid charge in the furnace is carefully controlled so that there is always a stable arc. As a result higher voltages may be used than with choke-fed furnaces and much higher power inputs are possible. In the present invention, with the interdependent controlled charging and controlled uniform power input, utilizing higher voltages and higher power densities, flare to the sidewalls is reduced, slag fluidity is constantly controlled, slag depth is reducible to a minimum and the rate of melting is substantially increased.

In making steel, carbon, e.g., coke, can be put in at the bottom of the furnace as indicated in FIGS. 3 and 4. The carbon content can be readily controlled by weighing the constituents before adding them to the furnace. Very little reduction need occur in this process so that only minor quantities of carbon monoxide gas are evolved. Of course, if reduction of any iron oxide in the sponge added to the furnace or of any metal oxides added is desired, this reduction is effectively carried out in the melting step by merely adding the desired amount of reducing carbon to the charge. This procedure is seen to be very desirable in the melting of partially reduced sponge iron. In the case of a high titania containing sponge it is desirable to add sufficient iron oxide to maintain the FeO level in the slag at in the order of 8–20%, such as by adding mill scale.

When dealing with high slag volumes, such as when melting high titania sponge iron, the slag may be tapped off from time to time during melting without signficant metal loss or wall erosion.

With the present process the refining step usually required can be essentially eliminated if high grade sponge, low in phosphorous, sulphur and other deleterious elements, is being melted, i.e., once the charge has been melted the metal bath needs only to be brought up to tapping temperature, alloys added for deoxidation and alloy content desired, and metal tapped, carbon content of the metal being controlled by the amount of carbon added to the original charge and the total metallics charged. In any case, a semi-finished steel can be produced which can be further treated, if desired, in an electric steel furnace or induction heated ladle for carbon and alloy adjustments. Furthermore, if desired, a master iron alloy can be produced by the present process which can be used for the formation of various other alloys.

This technique has been demonstrated on both high and low grade sponge iron in a ½ ton electric furnace. Heats were made employing a minimum ratio of 80% sponge and 20% scrap although much lower ratios of sponge to scrap can be readily employed. Treatment of low grade sponge with high $TiO_2$ and high total gangue content was of particular interest in demonstrating that such a low grade metal could be readily converted into good quality steel.

The invention is further illustrated by the following examples.

EXAMPLE I

A 500 kva. three phase conventional electric steel furnace was employed. The metallic charge consisted of 20% scrap, the balance being sponge pellets of the following analysis (by weight):

| | |
|---|---|
| Total Fe | 78.2 |
| Metallic Fe | 75.5 |
| FeO | 3.6 |
| S | 0.02 |
| C | 0.50 |
| $TiO_2$ | 11.4 |
| $SiO_2$ | 1.3 |
| $Al_2O_3$ | 5.7 |
| CaO+MgO | 1.5 |
| Miscell. | 0.5 |

This sponge was produced from concentrates of the following analysis:

| | Percent |
|---|---|
| Fe | 61.7 |
| $SiO_2$ | 0.7 |
| $Al_2O_3$ | 4.0 |
| $TiO_2$ | 8.6 |
| S | 0.03 |
| P | 0.03 |

Scrap was first placed in the bottom of the furnace, and the area of the slag line was fettled with 50 lbs. of lime. Carbon was not added in this particular heat but was in others. The furnace sidewalls were charged with sponge pellets to above the slag line. Power was placed on the furnace until a liquid pool developed to the bottom of the furnace indicated by the electrodes reaching the bottom of their travel. The remaining portion of sponge was charged at regular intervals around the electrodes and iron ore fume was added to maintain a fluid slag. A high slag volume resulted from the melting of this sponge and the molten slag was allowed to pour off during the latter half of the melting period, thereby minimizing the tendency for sidewall attack. In any case, the sponge originally charged around the sidewalls served to protect the refractory during meltdown. Moreover, by charging the sponge around the electrodes, once a pool of metal had developed the arc flare was prevented from radiating directly to the area of the sidewalls since the electrodes were physically surrounded with unmelted sponge. During the melting period ¾ of the gangue slag was allowed to drain from the furnace. This heat and others demonstrated that very little sidewall refractory attack is experienced in carrying out the process. Furthermore, large amounts of gangue slag, 25% of metallic charge weight in this heat, can be readily slagged off during melting without significant metal loss. Also, refining time can be markedly reduced as compared to scrap heats, the operations being mainly melting rapidly, keeping the FeO content of the slag in the order of 15% for good fluidity, flushing and removal of molten slag, bringing the bath up to temperature, making any necessary alloy additions and tapping. Carbon is readily controlled to provide the amount desired in the final product by the amount included in the initial charge calculated in accordance with the total metallics.

The results obtained from this particular heat of steel were as follows:

| | |
|---|---|
| Total charge in lbs. | 3453 |
| Metallic charge in lbs. | 2786 |
| Liquid steel in lbs. | 2580 |
| Yield in ladle, percent | 92.6 |
| Kwh./gross ton | 984 |
| Heat time, mins. | 63 |

These figures compare favourably with yields and heat time for a 100% scrap charge in the same furnace. The analysis of the steel obtained (percent by weight) was as follows:

| | |
|---|---|
| C | 0.14 |
| S | 0.03 |
| P | 0.035 |
| Si | 0.21 |
| Mn | 0.61 |
| Ti | 0.02 |

This heat was continuously cast into billets and rolled into $1\frac{3}{16}''$ bar. Tensile clearness tests showed the steel compared favourably with steel made from good scrap.

EXAMPLE II

A series of four heats were carried out on the same charge materials as used in Example I. The same procedure was used in charging and melting in each of these heats as in Example I and the accumulative and average results of all four heats were as follows:

| | |
|---|---|
| Total charge in lbs. | 8679 |
| Metallic charge in lbs. | 7034 |
| Liquid steel in lbs. | 6472 |
| Yield in ladle, percent | 92.0 |
| Kwh./gross ton | 1030 |
| Heat time, mins. | 62 |

The average analysis of the steel obtained was as follows:

| | |
|---|---|
| C | 0.23 |
| S | 0.027 |
| P | 0.032 |
| Si | 0.25 |
| Mn | 0.85 |
| Ti | 0.04 |

Each heat was continuously cast into billets and rolled into $1\frac{3}{16}''$ bar. Tensile clearness tests showed that the steel of these bars compared favourably with steel made from good scrap.

Figure 6:
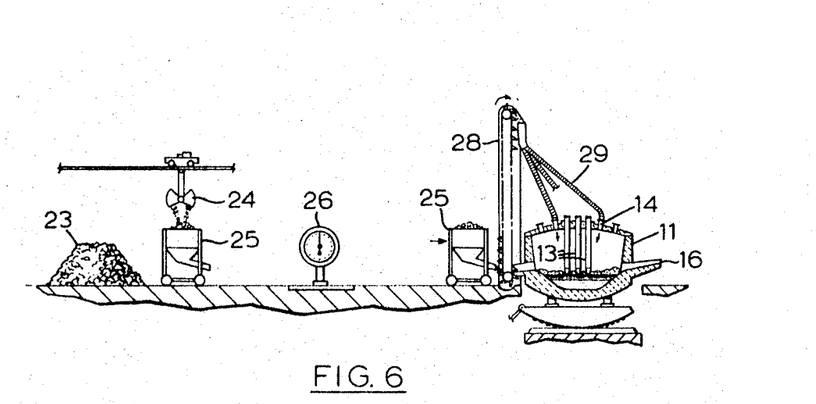
FIG. 6 is a diagrammatic, side elevational view, partly in section, of a feeding system for electric steelmaking in accordance with the process of the invention.

A feeding system which can be incorporated with the method of the present invention is shown in FIGURE 6. In this system the charge is loaded from a charge stockpile 23 by a loading device 24 into a hopper car 25. The hopper car 25 and its contents are weighed on a scale 26 for the make-up of the metal produced is determined by controlling the relative weights of its constituents. The charge is unloaded by a controlled charge feeder onto the platforms of an elevating device 28 to be delivered to flexible charge chutes 29 leading to the charge holes 14.

It is also possible, using the process of the present invention, to convert iron sponge together with the desired fluxes, carbon and metallic oxides or alloying elements into liquid metal in a continuously operated electric arc furnace. The product from such an operation is either an iron alloy (which is marketed as such or used as a master alloy for formation of further alloys) or a semi-refined steel. The latter is tapped into a ladle equipped with coreless induction coils or into an electric steel furnace.

When using an induction heated ladle, carbon and alloy additions are made, accurately weighed and controlled, and the induction heating adjusts temperature and provides homogeneity in the steel, readying it for casting. An electric steel furnace can be employed, if desired, in place of the induction heated ladle.

Figure 7:
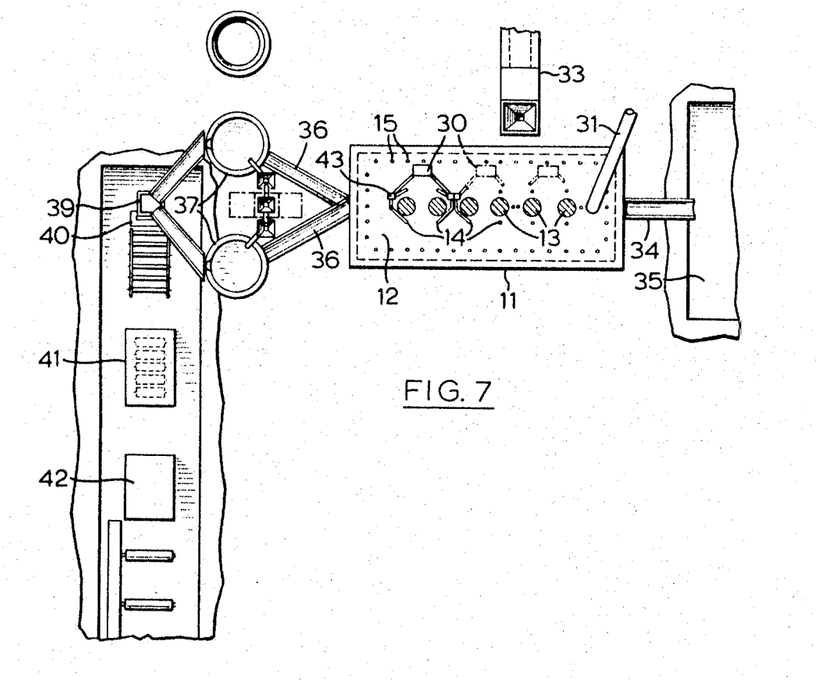
FIG. 7 is a diagrammatic plan view of a system for continuous charge melting in a rectangular, six electrode furnace and steelmaking and casting according to the invention.
Figure 8:
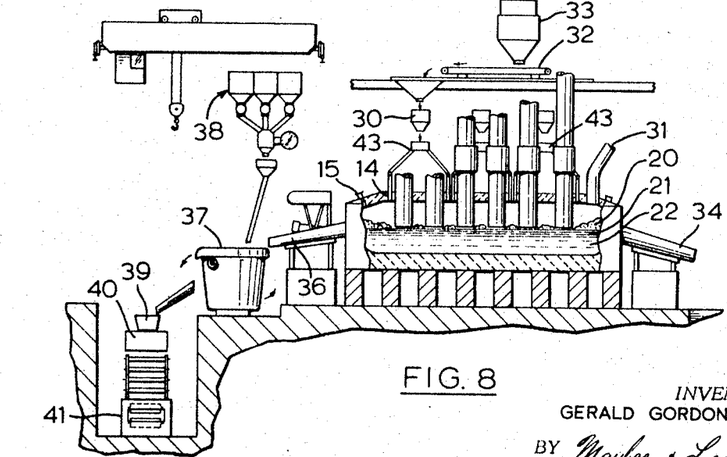
FIG. 8 is a side elevational view, partly in section, of the system shown in FIG. 7.

A system for carrying out the method of the present invention continuously in a rectangular six electrode furnace is shown in FIGS. 7 and 8. The melting furnace is equipped with a continuous charging system, which includes a charge conveying system 33 from which the charge is fed by means of a charge distributor 32, into weighing hoppers 30. From the weighing hoppers 30 the charge is fed through feed hoppers and chutes 43 and through the charging holes 14 into the areas of most intense heat in the furnace. The sponge iron can be added either in fine or agglomerated form. An agglomerated charge will allow the sponge to surround the electrodes and result in a high power density per sq. ft. of hearth, with high voltage. Any fluxes, metal oxides and carbon required are accurately metered into the furnace adjacent to the electrodes 13. Power consumption per ton of charge is accurately controlled at all times by integrating power input and charging rate. Thus, as afore-described, by maintaining a constant charging rate and constant power input to the furnace the furnace is maintained under substantially uniform control. At the same time, slag fluidity is constantly controlled at the desired level and the furnace remains in excellent thermal balance.

The physical conditions inside the furnace are such that on top of the layers of molten metal 22 and molten slag 21 there is solid charge 20 protecting the sidewalls. A large proportion of the charge is fed through the charge holes 14 immediately adjacent to the electrodes. The balance of the charge may be fed through the auxiliary charge holes 15 located in the roof adjacent the furnace walls, but in any case, solid charge is maintained banked along the side walls. As afore-mentioned, the purpose of feeding charge along the sidewalls is to protect the furnace sidewalls and endwalls from refractory attack. A gas off-take 31 is located in the roof.

The furnace can be of the round, three electrode type, as described in conjunction with FIGS. 1 through 6, but preferably the furnace is a rectangular furnace having six electrodes 13 in line, as shown in FIGS. 7 and 8. A rectangular, six electrode in line melting furnace has the advantages of better power factor and no arc flare to the sidewalls over the three phase, round, three electrode furnace. The flare is along the centre line and, although there is a flare to the end walls, the furnace can be run with an unbalanced load reducing the power in the end electrodes to reduce the end flare.

As mentioned previously, even if the sponge iron pellets are fed immediately around the electrodes, the electrodes continue to arc to the bath, so that solid, low density, sponge iron pellets fed around the electrodes can physically smother the arcs. This feature is particularly important at high power levels as it allows the voltage to be raised while controlling the metal bath temperature, which not only permits wider latitude in operating voltages but also minimizes heat loss to roof and walls, i.e., minimizes refractory attack. The furnace is completely closed and, as a result, the heat economy is higher than in an electric type of steel furnace and the furnace atmosphere can be controlled at will. Moreover when the furnace atmosphere is maintained substantially reducing, pencilling of electrodes is minimized. The electrodes can be of graphite or the self baking type, preferably the latter. Continuous melting in this closed furnace also results in lower electrode consumption than in a batch type electric steel furnace. In the manufacture of semi-finished steel the metal is tapped at 2900–3000° F. and a heel of molten metal is left in the furnace below the iron taphole at all times.

The main area of refractory attack is in the slag layer 21. This is minimized, as aforedescribed, by sidewall and end wall charging. Fluxes are added so as to ensure a fluid slag. The metal is tapped into ladles through a metal runner 36 into an induction furnace or ladle 37 or into an electric steel furnace. The slag, depending on its volume, is either tapped and disposed of or granulated at the furnace. Slag is tapped from one end of the furnace through the slag runner 34 into the slag pit 35 and metal from the other or both ends along one sidewall of the furnace. Since no scrap is involved the residual elements are normally quite low, being only those in the sponge.

For a high grade sponge, low in phosphorous and sulphur, the metal tapped from the melting furnace requires only carbon and any alloy additions and temperature adjustments to complete the heat of steel. Such metal is poured into an electric steel furnace for these additions and adjustments, with the heat time being very short.

Alternatively, the metal from the melting furnace is tapped into the induction heated ladle 37 where carbon is either added to the bottom or injected into the ladle of metal from additions hopper 38. Any alloy additions or adjustments necessary are made in the ladle. The advantage of the use of an induction heated ladle is that it is less costly than is the use of an electric steelmaking furnace and it allows adjustments at will to form different alloys. Plant or purchase scrap, on the other hand, can be converted into steel in a normal electric steelmaking furnace. The combination of continuous melting and ladle or electric steel furnace can be employed on a large as well as a small scale basis. It is even possible to locate the melting furnace and the induction heated ladle so that the former can be tapped into the latter with the latter then teeming into the continuous casting machines without crane handling. FIGS. 7 and 8 schematically show the continuous arc melting plus ladle steelmaking and casting where the metal is poured from the induction furnace 37 into a tundish 39 and from the tundish 39 into a continuous casting machine 40. The metal is then withdrawn, cooled and straightened as shown at 41 and run out and cut off as shown at 42.

A further feature of the continuous melting procedure is that it can, to some degree, act as a hot metal holding furnace as well as offering a means of separating gangue constituents from the metal. It can be equipped with a highly automated system, controlling not only the charging of sponge iron, but also the addition of the fluxes required for properly adjusting slag fluidity and conductivity, for effecting desulphurization in the bath and for accurately controlling the reduction of metallic oxides with carbon to obtain the desired content of alloying elements, such as, Ni, Cr and Mn in the iron, e.g., 1–50 nickel or 20 Cr, 10 Ni. The accurate control of charging and power input allows the furnace to be kept in thermal balance and the latter condition is also assisted by having, at all times, a heel of liquid metal in the furnace and by the use of solid charge for protecting the walls of the furnace from slag attack. A continuous melting furnace allows more flexibility of metal chemistry as the various charge constituents can be accurately weighed and charged into the furnace, thereby resulting in good control of slag and metal contents, i.e., a wide latitude of iron alloys of accurately controlled analyses can be made.

In a steelmaking operation the continuous melting-induction ladle combination allows accurately controlled grades of steel to be quickly made. Carbon and other alloying elements, usually in ferroalloys, can be accurately weighed and added to the ladle 37 through the automated weigh hoppers 38 located above the ladle 37. These additions can be either injected under pressure of nitrogen or argon in the ladle of molten iron or thrown into the ladle. In the latter case, any coke additions should be made to the bottom of the ladle and the molten iron poured on top of the coke. Small additions of lime, fluorspar and silica can be made to the ladle, if desired, to form a small amount of fluid slag which absorbs products of deoxidation, minimizes heat loss from the ladle and protects metal from the atmosphere. It can be seen that the continuous melting-ladle steelmaking combination makes steel by controlled additions of carbon and other alloying elements. In the present process the carbon does not have to be caught on the way down, i.e., the classic principle in steel refining of bringing carbon down with FeO and then adding alloys does not have to be followed. Instead, continuously melted molten iron is transferred from the electric furnace to an induction heated ladle or an arc furnace where weighed additions of carbon and alloys are made and the mixture is then heated to casting temperature. The use of the induction furnace has advantages over the electric furnace in that it eliminates one step, provides homogeneity as a result of inductive stirring and avoids carbon pick-up from electrodes.

Figures 9, 10:
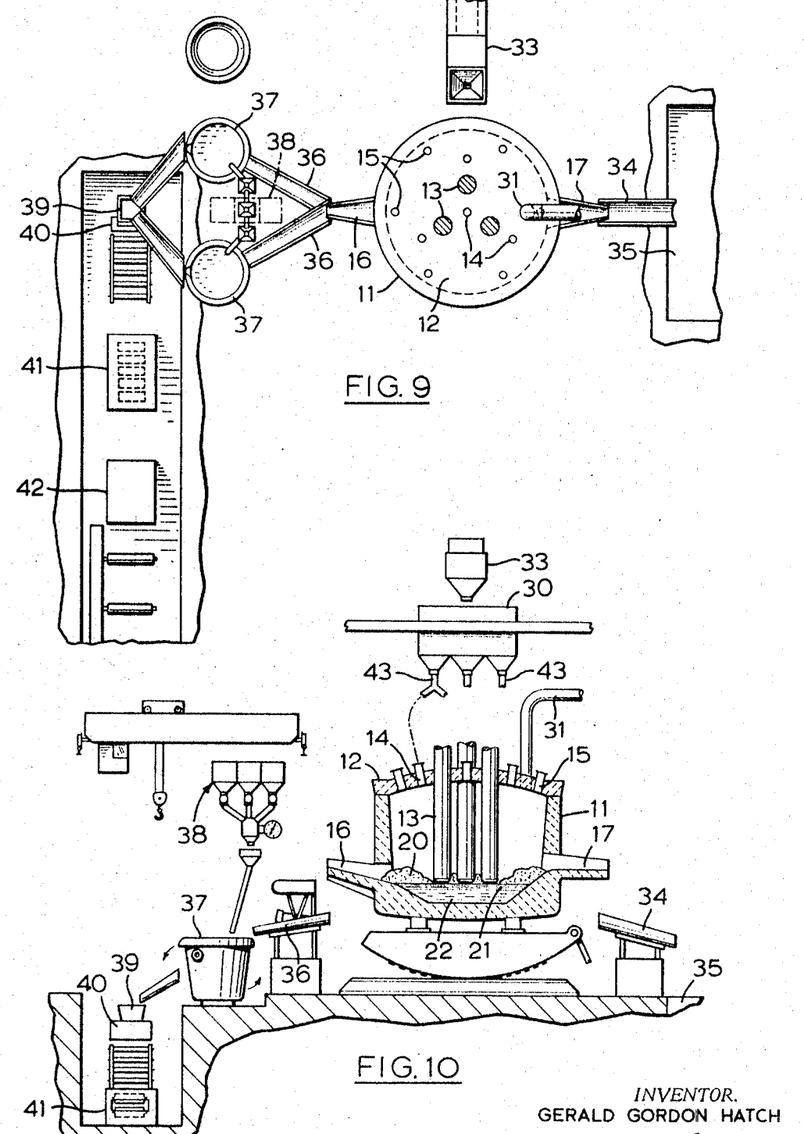
FIG. 9 is a diagrammatic plan view of a system for continuous charge melting in a circular three electrode furnace and steelmaking and casting according to the invention.
FIG. 10 is a side elevational view, partly in section, of the system shown in FIG. 9.

The continuous operation of the process has been described in conjunction with FIGS. 7 and 8, with operation of a rectangular six electrode furnace being illustrated and described. As aforementioned, however, a round three electrode type can be used for continuous production of molten steel or iron alloy, and FIGS. 9 and 10 illustrate such a system. The continuous charge conveying system 33 is shown with the charge leading therefrom and into the weighing hoppers 30. From the weighing hoppers 30 charge is fed through the feed hoppers and chutes 43 and then through the charging holes 14 in the roof 12 and into the furnace 11 adjacent the electrodes 13. The solid charge 20 is shown above the molten metal layer 22 and slag layer 21 surrounding the electrodes 13 and protecting the sidewalls. The auxiliary charge holes 15 for sidewall feeding and the gas off-take 31 are also shown.

The slag and metal tapping system, induction heating system and casting system shown in FIGS. 9 and 10 are the same as illustrated and described in conjunction with FIGS. 7 and 8. Thus the metal runner 36 carries metal tapped from the furnace 11 into the induction furnace or ladle 37 and slag is carried through the slag runner 34 into the slag pit 35. Additions hopper 38 is shown above the ladle 37, with the ladle pouring into the tundish 39 and from thence into the continuous casting machine 40. The cooling, straightening and cut off operations are also shown at 41 and 42.

What I claim is:

1. A process for the manufacture of steel and other alloys of iron from sponge iron in an electric arc furnace said process requiring very little reduction and producing only minor quantities of carbon monoxide gas, in which the sponge iron is melted to form a layer of molten metal and a layer of slag thereon, which comprises charging the furnace sidewalls with sponge iron pellets to above the slag line in the furnace, supplying power to the furnace electrodes to form an arc and to melt metal in and form a pool of molten metal at the bottom of the furnace, continually and substantially uniformly charging sponge iron around the electrodes into the areas of most intense heat to provide and maintain excess solid charge in the furnace around the electrodes to substantially smother said arc, thereby protecting the furnace sidewalls and roof from radiation, minimizing heat losses during melting and increasing the rate of melting while still maintaining a stable arc and substantially uniform power input to the electrodes during said uniform charging to melt said sponge iron, adding fluxes and metal oxides necessary for a fluid slag, maintaining the addition of sponge iron and controlling this addition and the amount of solid charge in the furnace to maintain a fluid slag and a stable arc, maintaining solid sponge iron banked around the furnace sidewalls during melting to protect the sidewalls from slag attack, removing gangue slag from the furnace during melting, thereby minimizing the tendency for sidewall slag attack, adding any necessary alloying elements and tapping molten iron alloy formed from the sponge iron charged to the furnace.

2. A process as claimed in claim 1 wherein steel scrap is first charged to the centre and bottom of the furnace and the pool of molten metal is formed by the melting of said scrap.

3. A process for the continuous manufacture of steel and other alloys of iron from sponge iron in an electric arc furnace said process requiring very little reduction and producing only minor quantities of carbon monoxide gas, in which the sponge iron is melted to form a layer of molten metal and a layer of slag thereon, which comprises continually charging sponge iron to an electric arc furnace under power in which a pool of molten metal is established and maintained at the bottom thereof, a portion of the sponge iron being charged against the furnace sidewalls to above the slag line in the furnace, sponge iron being continually and substantially uniformly charged around the electrodes of the electric arc furnace into the areas of most intense heat to provide and maintain excess solid charge in the furnace around the electrodes to substantially smother said arc, thereby protecting the furnace sidewalls and roof from radiation, minimizing heat losses during melting and increasing the rate of melting while still maintaining a stable arc and substantially uniform power input to the electrodes during said uniform charging to melt said sponge iron, adding fluxes and metal oxides necessary for a fluid slag, maintaining the addition of sponge iron and controlling this addition and the amount of solid charge in the furnace to maintain a fluid slag and a stable arc, maintaining solid sponge iron banked around the furnace sidewalls above the slag line, except at the slag spout, to protect the sidewalls from slag attack, continually removing gangue slag from the furnace during melting to minimize the tendency for sidewall slag attack, adding any necessary alloying elements, tapping molten iron alloy formed from the sponge iron charged to the furnace, leaving a molten heel of metal at the bottom of the electric furnace and continuing the charging of sponge iron to and melting of sponge iron in the furnace.

4. A process as claimed in claim 3 wherein the sponge iron continually charged around the electrodes is fed through a plurality of charge ports in the furnace roof closely adjacent the electrodes.

5. A process as claimed in claim 3 wherein the sponge iron charging rate and the furnace power input are controlled so that the bath temperature is not allowed to rise substantially above the melting point of iron during the melting period thereby minimizing undercutting of the slag and refractory attack and preventing occurrence of violent boiling due to reaction of carbon with metals in the slag.

6. A process as claimed in claim 3 wherein solid sponge iron is charged through auxiliary charge ports adjacent the furnace walls to maintain solid sponge iron banked against the furnace sidewalls during melting.

7. A process as claimed in claim 3 wherein the molten iron is tapped into an induction heated ladle, carbon and alloy additions are made to the ladle to form steel therein, homogeneity is provided in the molten iron alloy by inductive stirring and the temperature of molten metal in the ladle is adjusted for the casting of finished steel.

8. A process as claimed in claim 3 wherein a molten iron alloy is manufactured in the electric furnace for use as a master alloy.

9. A process as claimed in claim 3 wherein the melting is carried out in a rectangular electric arc furnace having six electrodes in line.

10. A process as claimed in claim 9 wherein the melting is carried out in a closed furnace and the atmosphere is maintained substantially reducing, thereby minimizing electrode consumption.

11. A process as claimed in claim 3 wherein a high grade sponge, low in phosphorus and sulphur, is melted in the electric furnace and molten metal is continually tapped into an electric steel furnace or an induction heated ladle for carbon and any alloy additions to form finished steel.

12. A process as claimed in claim 11 wherein the electric melting furnace is tapped into an induction heated ladle and the furnace and ladle are located so that said ladle is teemed directly into a tundish and a continuous casting machine to eliminate crane handling.

13. A process for the manufacture of steel and other alloys of iron from sponge iron with a high titania content in an electric arc furnace said process requiring very little reduction and producing only minor quantities of carbon monoxide gas, in which the sponge iron is melted to form a layer of molten metal and a layer of slag thereon, which comprises charging the furnace sidewalls with high titania sponge iron to above the slag line in the furnace, supplying power to the furnace electrodes to form an arc and to melt metal in and form a pool of molten metal at the bottom of the furnace, continually and substantially uniformly charging high titania sponge iron around the electrodes into the areas of most intense heat to provide and maintain excess solid charge in the furnace around the electrodes to substantially smother said arc, thereby protecting the furnace sidewalls and roof from radiation, minimizing heat losses during melting and increasing the rate of melting while still maintaining a stable arc and substantially uniform power input to the electrodes during said uniform charging to melt said high titania sponge iron, adding fluxes and metal oxides, including iron oxide, necessary for a fluid slag, maintaining the addition of sponge iron and controlling this addition and the amount of solid charge in the furnace to maintain a fluid slag and a stable arc, the addition of iron oxide being sufficient to maintain a fluid slag, maintaining solid sponge iron banked around the furnace sidewalls during melting to protect the sidewalls from slag attack, continually removing from the furnace the large amounts of titania-containing gangue slag formed during melting, thereby minimizing the tendency for sidewall slag attack, adding any necessary alloying elements and tapping molten iron alloy formed from the high titania sponge iron charged to the furnace.

14. A process for the continuous manufacture of steel and other alloys of iron from sponge iron with a high titania content in an electric arc furnace said process requiring very little reduction and producing only minor quantities of carbon monoxide gas, in which the sponge iron is melted to form a layer of molten metal and a layer of slag thereon, which comprises continually charging said high titania sponge iron to an electric arc furnace under power in which a pool of molten metal is established and maintained at the bottom thereof, a portion of the high titania sponge iron pellets being charged against the furnace sidewalls to above the slag line in the furnace, high titania sponge iron being continually and substantially uniformly charged around the electrodes of the electric arc furnace into the areas of most intense heat to provide and maintain excess solid charge in the furnace around the electrodes to substantially smother said arc, thereby protecting the furnace sidewalls and roof from radiation, minimizing heat losses during melting and increasing the rate of melting while still maintaining a stable arc and substantially uniform power input to the electrodes during said uniform charging to melt said high titania sponge iron, adding fluxes and metal oxides, including iron oxide, necessary for a fluid slag, maintaining the addition of sponge iron and controlling this addition and the amount of solid charge with furnace to maintain a fluid slag and a stable arc, the addition of iron oxide being sufficient to maintain a fluid slag, maintaining solid sponge iron banked around the furnace sidewalls above the slag line, except at the slag spout, to protect the sidewalls from slag attack, continually removing from the furnace the large amounts of titania-containing gangue slag formed during melting to minimize the tendency for sidewall slag attack, adding any necessary alloying elements, tapping molten iron alloy formed from the high titania sponge iron charged to the furnace, leaving a molten heel of metal at the bottom of the electric furnace and continuing the charging of high titania sponge iron to and melting of sponge iron in the furnace.

15. A process for the manufacture of steel and other alloys of iron from sponge iron in an electric arc furnace said process requiring very little reduction and producing only minor quantities of carbon monoxide gas, in which the sponge iron is melted to form a layer of molten metal and a layer of slag thereon, which comprises charging the furnace sidewalls with sponge iron to above the slag line in the furnace, charging iron scrap to the centre and bottom of the furnace, supplying power to the electrodes to form an arc and to melt metal in and form a pool of molten metal from the iron scrap at the bottom of the furnace, continually and substantially uniformly charging sponge iron around the electrodes through charge ports in the furnace roof closely adjacent the electrodes into the areas of most intense heat to provide and maintain excess solid charge in the furnace around the electrodes to substantially smother said arc, while still maintaining a stable arc and substantially uniform power input to the electrodes during said uniform charging to melt said sponge iron, adding fluxes and metal oxides necessary for a fluid slag, maintaining the addition of sponge iron and controlling this addition and the amount of solid charge in the furnace to maintain a fluid slag and a stable arc, allowing said sponge iron charged around the electrodes to build up as a solid charge around the electrodes, while still maintaining a fluid slag, thereby protecting the furnace sidewalls and roof from radiation, minimizing heat losses during melting and increasing the rate of melting, feeding sponge iron during melting through auxiliary charge ports in the furnace roof adjacent the furnace walls to maintain solid sponge iron banked around the furnace sidewalls, but substantially free from above the slag line at the slag spout, to protect the sidewalls from slag attack, controlling the sponge iron charging rate and furnace power input so that the molten metal bath temperature is not allowed to rise substantially above the melting point of iron during the melting period, thereby minimizing undercutting of the slag and refractory attack and preventing occurrence of violent boiling due to reaction of carbon with metals in the slag, removing gangue slag from the furnace during melting thereby minimizing the tendency for sidewall slag attack, adding any necessary alloying elements and tapping molten iron alloy formed from the sponge iron charged to the furnace.

16. A process for the continuous manufacture of steel and other alloys of iron from sponge iron in an electric furnace said process requiring very little reduction and producing only minor quantities of carbon monoxide gas, in which the sponge iron is melted to form a layer of molten metal and a layer of slag thereon which comprises continually charging sponge iron to an electric arc furnace under power in which a pool of molten metal is established and maintained at the bottom thereof, a portion of the sponge iron being charged against the furnace sidewalls to above the slag line in the furnace, sponge iron being continually and substantially uniformly charged around the electrodes of the electric arc furnace through charge ports in the furnace roof closely adjacent the electrodes into the areas of most intense heat to provide and maintain excess solid charge in the furnace around the electrodes to subtsantially smother said arc, while still maintaining a stable arc and substantially uniform power input to the electrodes during said uniform charging to melt said sponge iron, adding fluxes and metal oxides necessary for a fluid slag, maintaining the addition of sponge iron and controlling this addition and the amount of solid charge in the furnace to maintain a fluid slag and a stable arc, allowing said sponge iron charged around the electrodes to build up as a solid charge around the electrodes, while still maintaining a fluid slag, thereby protecting the furnace sidewalls and roof from radiation, minimizing heat losses during melting and increasing the rate of melting, feeding sponge iron during melting through auxiliary charge ports in the furnace roof adjacent the furnace walls to maintain solid sponge iron banked around the furnace sidewalls above the slag line, but substantially free from above the slag line at the slag spout, to protect the sidewalls from slag attack, controlling the sponge iron charging rate and furnace power input so that the molten metal bath temperature is not allowed to rise substantially above the melting point of iron during the melting period, thereby minimizing undercutting of the slag and refractory attack and preventing occurrence of violent boiling due to reaction of carbon with metals in the slag, continually removing gangue slag from the furnace during melting to minimize the tendency for sidewall slag attack, adding any necessary alloying elements, tapping molten iron alloy formed from the sponge iron charged to the furnace, leaving a molten heel of metal at the bottom of the electric furnace and continuing the charging of sponge iron to and melting of sponge iron in the furnace.

17. A process as claimed in claim 16 wherein sponge iron with a high titania content is charged to the furnace, iron oxide is charged to the furnace with the fluxes and the high titania sponge to maintain an FeO content in the slag of in the order of 8 to 20% and the large amounts of titania-containing gangue slag formed during melting are continually removed from the furnace.

References Cited
UNITED STATES PATENTS

| | | | |
|---|---|---|---|
| 2,704,248 | 3/1955 | Madaras | 75—43 X |
| 2,805,930 | 9/1957 | Udy | 75—11 |
| 3,153,588 | 10/1964 | Madaras | 75—43 X |
| 3,202,503 | 8/1965 | Shimamura et al. | 75—38 |

L. DEWAYNE RUTLEDGE, Primary Examiner

J. E. LEGRU, Assistant Examiner

U.S. Cl. X.R.

75—44